United States Patent

Ohmi et al.

[11] Patent Number: 5,923,693
[45] Date of Patent: Jul. 13, 1999

[54] DISCHARGE ELECTRODE, SHAPE-RESTORATION THEREOF, EXCIMER LASER OSCILLATOR, AND STEPPER

[75] Inventors: Tadahiro Ohmi, 1-17-301, Komegafukuro 2-chome, Aoba-ku, Sendai-shi, Miyagi-ken; Naoto Sano, Utsunomiya; Yasuyuki Shirai, Sendai, all of Japan

[73] Assignees: Tadahiro Ohmi, Miyagi-ken; Canon Kabushiki Kaisha, Tokyo, both of Japan

[21] Appl. No.: 08/807,784

[22] Filed: Feb. 28, 1997

[30] Foreign Application Priority Data

Mar. 7, 1996 [JP] Japan ................................. 8-079572

[51] Int. Cl.$^6$ ....................................................... H01S 3/22
[52] U.S. Cl. ............................................... 372/57; 372/87
[58] Field of Search ................................. 372/55–57, 61, 372/81, 87; 219/121.52, 121.59, 121.85

[56] References Cited

U.S. PATENT DOCUMENTS

| 4,810,851 | 3/1989 | Fridlyand | 219/121.59 |
| 4,891,818 | 1/1990 | Levatter | 372/57 |
| 4,956,847 | 9/1990 | Terai et al. | 372/87 |
| 4,956,848 | 9/1990 | Terai et al. | 372/87 |
| 5,009,963 | 4/1991 | Ohmi et al. | 428/472.2 |
| 5,187,716 | 2/1993 | Haruta et al. | 372/57 |
| 5,224,998 | 7/1993 | Ohmi et al. | 118/720 |
| 5,295,668 | 3/1994 | Ohmi et al. | 266/252 |
| 5,407,492 | 4/1995 | Ohmi et al. | 148/287 |

FOREIGN PATENT DOCUMENTS 6-152013  5/1994  Japan .

OTHER PUBLICATIONS

IEEE Transactions on Semiconductor Manufacturing, "Flourine Passivation of Metal Surface for Self–Cleaning Semiconductor Equipment", Feb. 1990, vol. 3, pp. 42–51.

Primary Examiner—John D. Lee
Attorney, Agent, or Firm—Fitzpatrick, Cella, Harper & Scinto

[57] ABSTRACT

A discharge electrode for an excimer laser oscillator according to the present invention contains oxygen at a content of not more than 10 ppm, and a method of restoring the shape of a discharge electrode according to the present invention comprises introducing an inert gas into a laser chamber, and conducting discharge for several seconds.

9 Claims, 7 Drawing Sheets

DISCHARGE ELECTRODE, SHAPE-RESTORATION THEREOF, EXCIMER LASER OSCILLATOR, AND STEPPER

BACKGROUND OF THE INVENTION

1. Field of the Invention

The present invention relates to a discharge electrode of an excimer laser oscillator which is useful for working metals, resins, glass, ceramics, semiconductors, and so forth, and for accelerating chemical reactions. The present invention relates also to a method for shape-restoration of a deformed discharge electrode. In particular, the present invention relates to a discharge electrode which is highly stable in the energy output and the beam shape, and gives a longer life to the excimer laser oscillator, and relates also to a method for shape-restoration of a deformed discharge electrode. Further, the present invention relates to an excimer laser oscillator and a stepper employing the above discharge electrode.

2. Related Background Art

The excimer laser is attracting attention as the high-output laser capable for producing oscillation in the ultraviolet region, and has promising applications in the electronic industry, chemical industry, and energy industry.

The excimer laser oscillator, which produces excimer laser radiation, excites a laser gas such as Ar, Kr, Xe, KrF, and ArF filled in a manifold by electron beam irradiation or electric discharge. The resulting excited atom combines with a ground-state atom to form a molecule which can exist only in an excited state. This molecule, called excimer, is unstable, and immediately emits ultraviolet light to return to the ground state. This transition is called bond-free transition. The excimer laser oscillator multiplies the ultraviolet light produced by the transition by means of an optical resonator constituted of a pair of mirrors or the like, and emits the energy of the ultraviolet light as a laser beam.

An excimer laser system is explained by reference to FIG. 1.

In FIG. 1, the excimer laser system comprises a laser chamber 1, a band-narrowing module 2 to control the spectrum breadth of the oscillated light to be narrow, a pulse power module 3 for applying high voltage to electrodes in the chamber 1, an optical monitor module 4 for measuring the energy intensity and wavelength of the produced laser oscillation, a high voltage power source 5, a controller 6 for controlling the entire excimer laser system, a reflection mirror 7 constituting a resonator, a half mirror 8 for monitoring, a motor 9, and a window 10.

For use of the above excimer laser system as an exposure light source for a stepper, the controller 6 comprising a computer and other devices is connected through an interface to a stepper-controlling unit 12, a stepper-controlling computer 13, and so forth.

The laser chamber 1 is filled with a laser gas, such as $F_2$, Kr, and Ne. With application of a high-voltage DC pulse from the pulse power module 3 between the cathode electrode and the anode electrode in the laser chamber, electric discharge occurs through the gas, and light is generated. The generated light is reflected repeatedly in the optical system between the output mirror 7 and the band-narrowing module 2 to be amplified, and emitted to the outside.

To obtain a laser beam of an intended wavelength, a part of the emitted laser light is introduced by a half-mirror 8 to an optical monitor module 4 to measure the wavelength of the light. In accordance with the measurement result, a stepping motor 9 is driven to optimize the optical system of the band-narrowing module 2. The power of the laser light is also monitored continually by this optical monitor module.

FIG. 2 is a schematic sectional view of the laser chamber 1 taken vertically to the laser beam oscillation direction.

In FIG. 2, the laser chamber 1 is constructed from two aluminum housing members 21, 22, and is sealed with an O-ring 23. In the chamber 1, a cathode 26 is fixed by an insulator 24 and a cathode-supporting member 25, and an anode 27 is fixed by an anode-supporting member 28 to the housing member. The numeral 29 denotes a sealing member. A connector 30 connects the cathode 26 to a pulse power module 3. The numeral 31 denotes a blower; 32, a heat exchanger; 33, an opening having a mesh filter for gas feed and evacuation; and 34, a dust catcher.

FIG. 3 shows a gas-feeding system which was developed by the inventors of the present invention. The system has three gas-feeding line systems consisting of a 1% Kr/Ne gas-feeding line 41, a 1% $F_2$/1% Kr/Ne gas-feeding line 42, and a He gas-feeding line 43. The respective gas-feeding lines have an orifice 44, 45, or 46, and a valve 47, 48, or 49. The valves are connected to a manifold 50. A 100% He gas is used as a purge gas when the window plate of the laser chamber is exchanged, or in other cases.

A connecting tube 51 for gas feeding has a chamber valve 52 and a valve 53, and is connected to the manifold 50. An $F_2$ gas-replenishing tube 54 is connected to the manifold 50 and to the connecting tube 51 through an injection valve 55 and a flow control orifice 56.

When the pressure in the manifold 50 rises abnormally to exceed a predetermined level, a spring valve 57 opens to release the pressure. The gas-feeding system comprises further an evacuation line 58 for the manifold, a valve 59 for evacuating the interior of the laser chamber when an abnormal phenomenon occurs in the laser chamber and being handled manually similarly as the valve 53, an $F_2$-detoxifying device 60, an evacuation pump 61, an evacuation valve 62 provided on an evacuation line for evacuating the manifold 50, a variable valve 63, and a pressure gauge p.

Conventionally, to fill a laser discharge gas of a predetermined $F_2$-gas concentration of, for example, 0.1% in the laser chamber, firstly a 1% $F_2$/1% Kr/Ne gas is introduced through the manifold 50 and the tube 51 into the chamber 1 to a pressure of 30 kPa, for example, by monitoring with a pressure gauge, and then 1% Kr/Ne gas is introduced therein to a pressure of 300 kPa. Thus the gas mixture filled in the chamber contains 0.1% $F_2$.

Since the $F_2$ concentration decreases in the course of repeated laser oscillation, a necessary amount of the 1% $F_2$/1% Kr/Ne gas is replenished through the manifold 50 and the tube 54 to the chamber 1 every time.

Conventionally, to avoid fluorination of the electrodes, an alloy having relatively high resistance to fluorine is used as the material for the anode 27 and the cathode 26. Examples of the material include platinum, gold, rhodium, ruthenium, osmium, and iridium as shown in Japanese Patent Application Laid-Open No. 6-152013.

The excimer laser oscillator employing such electrodes involves problems as follows: (1) the discharge is unstable, and the pulse energy varies in a range of up to about 10%; and (2) the electrodes are deteriorated and deformed to render the electric field nonuniform, causing pulse energy variation, and necessitating frequent exchange of the electrodes.

SUMMARY OF THE INVENTION

The present invention intends to provide a discharge electrode producing stable discharge with less variation of the pulse energy.

The present invention also intends to provide a method for shape restoration of the deformed electrode in a simple manner without exchanging the electrode.

The present invention further intends to provide a stepper capable of conducting exposure (aligning) in a fine pattern of 0.25 µm or finer, stably for a long term.

The discharge electrode of the present invention contains oxygen at a content of not more than 10 ppm.

The excimer laser oscillator of the present invention employs a discharge electrode containing oxygen at a content of not more than 10 ppm.

The stepper of the present invention comprises an excimer laser oscillator employing a discharge electrode containing oxygen at a content of not more than 10 ppm, and a stage for moving a substrate.

The method of restoring the shape of the electrode of the present invention comprises introducing an inert gas into a laser chamber, and causing discharge for several seconds.

DETAILED DESCRIPTION OF THE PREFERRED EMBODIMENTS

The discharge electrode of the present invention contains oxygen at a content of not more than 10 ppm, preferably not more than 1 ppm.

The inventors of the present invention studied comprehensively the causes of unstableness of the discharge and variation of the pulse energy of as high as 10%. Consequently, an oxide film was found to be formed on the surface of the electrode. This oxide film was considered to cause the unstableness of the electric field and the variation of the pulse energy.

Further, the source of the oxygen of the oxide formation was found to be the electrode itself. That is, during the discharge, the discharge electrode is sputtered, and the oxygen contained in the interior of the electrode is released from the discharge electrode by continuation of sputtering. This released oxygen oxidizes the surface of the discharge electrode.

Therefore, the inventors of the present invention tried to lower the oxygen content of the electrode. However, the simple lowering of the oxygen content did not necessarily reduce the variation of the pulse energy. A critical value of the oxygen content was found to exist at 10 ppm. Below 10 ppm, the variation of the pulse energy decreased remarkably. In particular, the decrease of the variation was more remarkable at the oxygen content 1 ppm or lower.

The material of the electrode of the present invention is composed mainly of at least one metal selected from the group of Al, Ni, Cr, and Fe, and contains oxygen at a content mentioned above. Of these metals, a nickel-based alloy is preferred. More suitable material is a nickel-based alloy composed mainly of nickel and additionally of Fe, Cr, or Al below a certain content, specifically at a content of not more than 25% by weight.

In addition to the surface of the discharge electrodes, the inside surface of the chamber and the surfaces of the members provided in the chamber are preferably coated with a film of aluminum oxide, aluminum fluoride, magnesium fluoride, or the like. The coating is conducted by the treatment method shown in U.S. Pat. No. 5,009,963.

Figure 4:
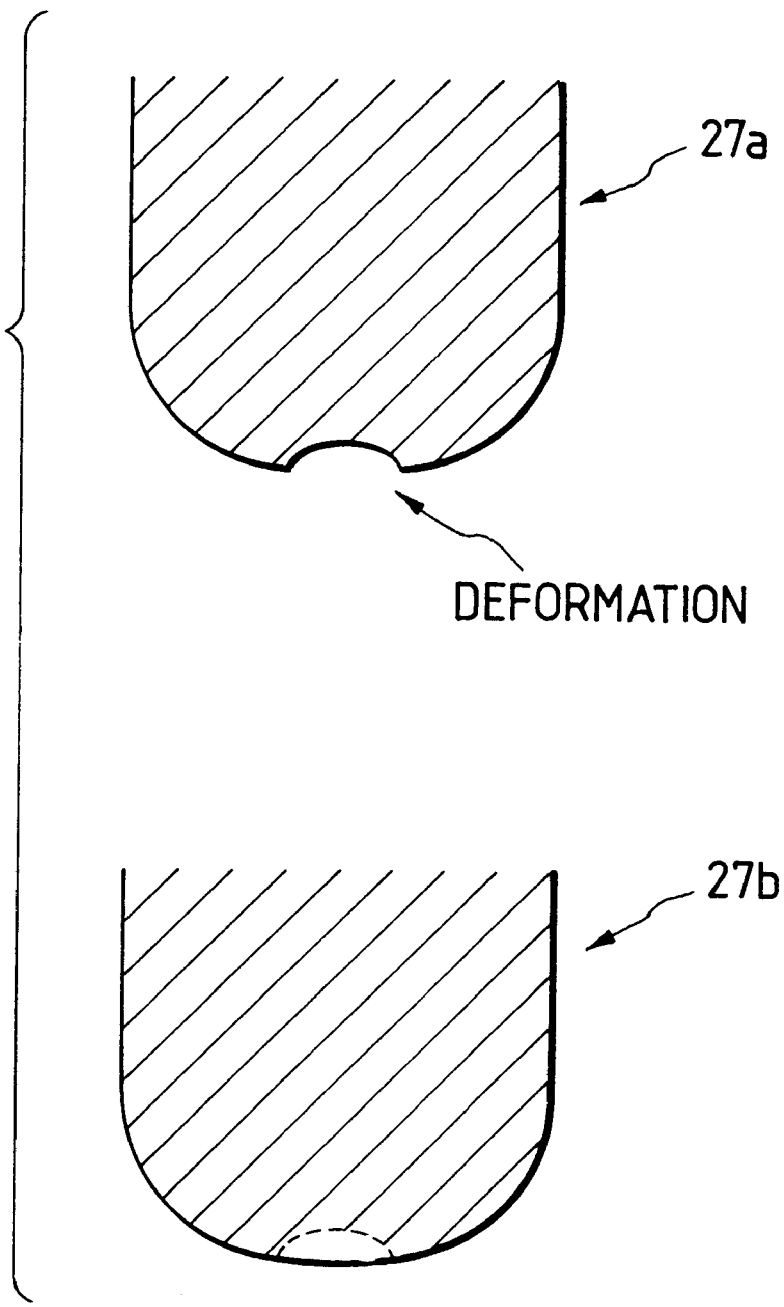
FIG. 4 shows consumption and deformation of an electrode.

The electrode is worn out (deteriorated) and changes its shape by repeated excimer laser oscillation as shown by the numeral 27a in FIG. 4.

The electrode can be reformed to restore the original shape by introducing an inert gas into the chamber and conducting discharge for several seconds between the electrodes to fuse the tip of the electrode. The minimum laser oscillation power for the electrode shape restoration is required to fuse the tip of the electrode. Since the required power depends on the material of the electrode and other conditions, the power is preferably decided by preliminary experiment.

The present invention is described more specifically by reference to Examples.

EXAMPLE 1

Figure 5:
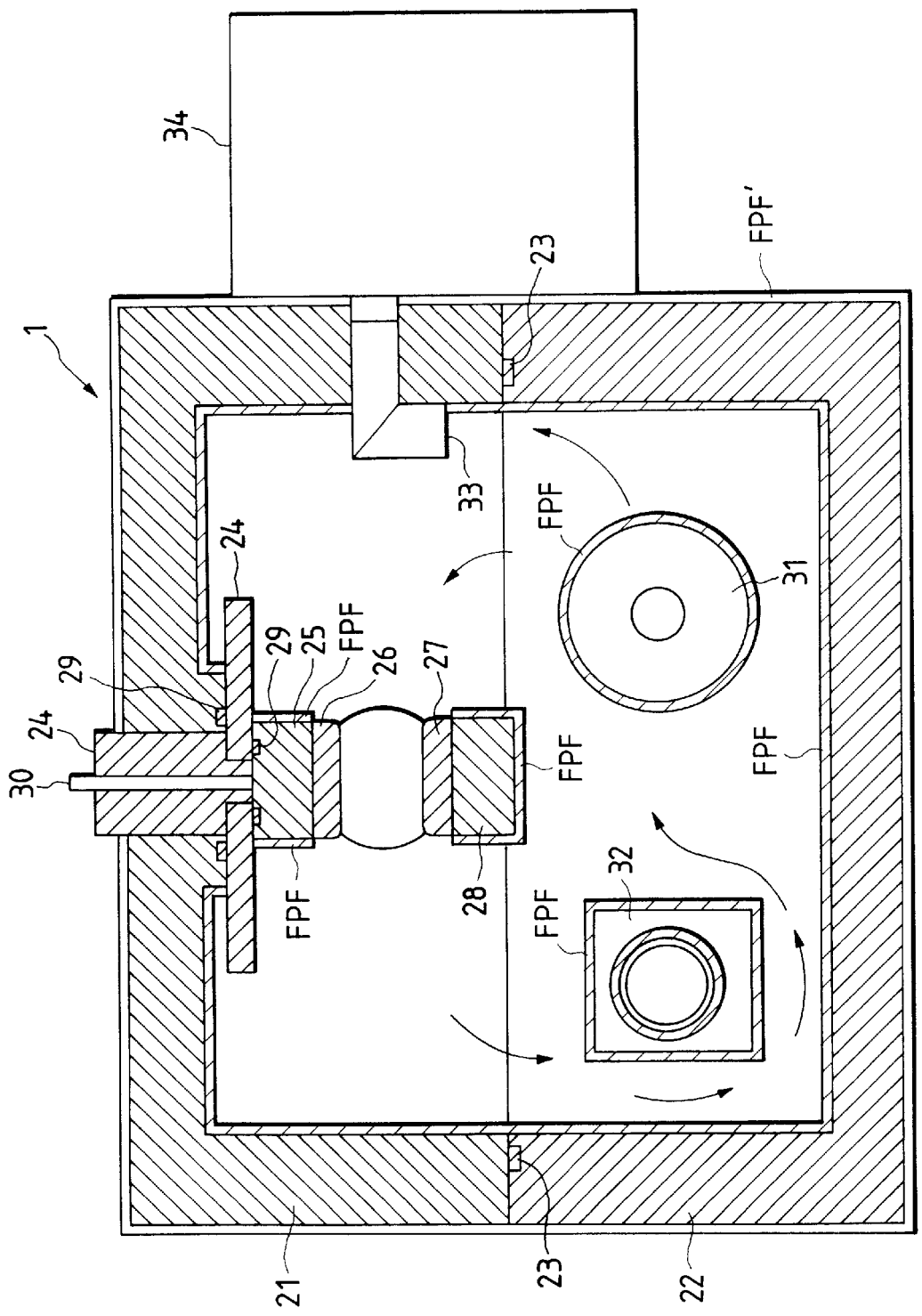
FIG. 5 is a schematic sectional view showing the structure of a laser chamber employing the electrode of the present invention.

A fluorine-passivation film (FPF) was formed on the internal surface of a laser chamber having the structure shown in FIG. 5. The procedure is shown below.

Figure 6:
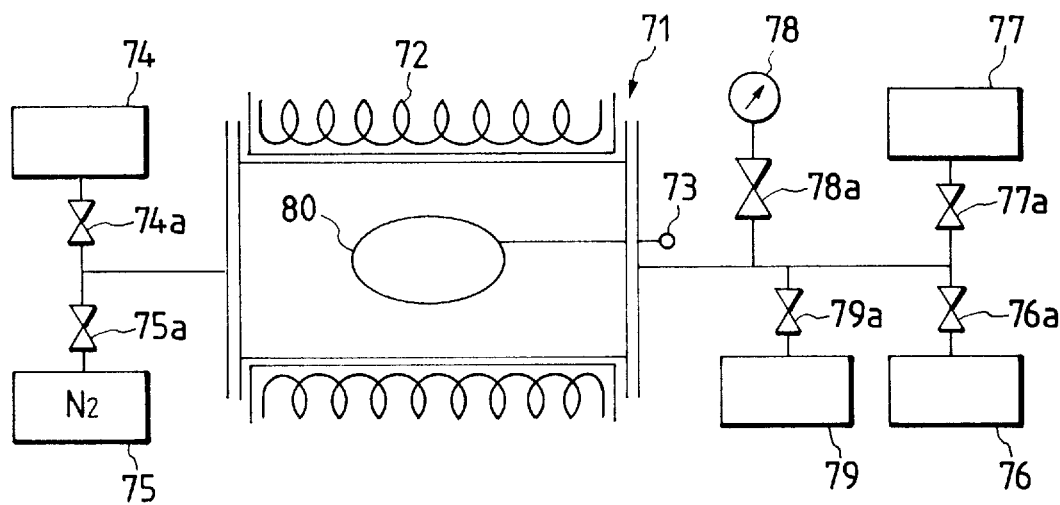
FIG. 6 shows an apparatus for fluorine passivation treatment.

FIG. 6 illustrates schematically the treatment apparatus. A treatment vessel 71 for baking and fluorine-passivation treatment is hermetically sealable, and is equipped with a heating means 72. A temperature control means 73 measures and indicates the temperature in the treatment vessel 71.

Gas feeding means 74, 75 for feeding high-purity fluorine gas and high-purity nitrogen gas are connected through the valves 74a, 75a to the treatment vessel 71.

A vacuum pump 76, and an evacuation means 77 are connected through valves 76a, 77a to the treatment vessel 71. To the connecting line, a pressure gauge 78 and a dew-point hygrometer 79 are connected through valves 78a, 79a.

In this Example, the electrode material was an aluminum-based alloy containing 3.5% by weight of Mg, and 0.12% by weight of Zr. This alloy contained Mn, Si, Fe, Cu, Cr, and Zn at a respective content of not more than 0.05% by weight.

A substrate 80 which had a smooth surface made by electrolytic polishing and acid washing was placed in the treatment vessel 71.

The fluorine-passivation treatment was conducted by use of the above apparatus shown in FIG. 6.

With the substrate 80 placed in the treatment vessel 71, the treatment vessel 71 was evacuated by the vacuum pump 76. After evacuation, the valves of the vacuum pump 76 and the evacuation means 77 were closed. Then high-purity nitrogen gas was introduced into the treatment vessel 71.

On the other hand, the interior of the treatment vessel 71 was heated to 300° C. and baked for 2 hours. By the baking, moisture or the like adhering to the aluminum alloy of the substrate 80 was gasified, and removed from the treatment vessel 71. The progress of the baking was monitored by measuring the dew point of the exhaust gas by a dew-point hygrometer 79.

After the baking, the valve 75a was closed, and the interior of the treatment vessel 71 was evacuated by the vacuum pump. The valves of the vacuum pump 76 and the evacuation means 77 were closed. Then, high-purity fluorine gas was introduced into the treatment vessel 71 by opening the valve 74a. The interior of the treatment vessel 71 was heated to 300° C. for one hour to conduct fluorine-passivation treatment. The fluorine gas employed contained impurities other than fluorine at a content of not more than 10 ppb.

After the fluorine-passivation treatment, the treatment vessel 71 was again evacuated. Therein gaseous nitrogen was introduced, and heat-treatment was conducted at 450° C. for 2 hours.

As a result, a fluorine-passivation film containing aluminum fluoride ($AlF_3$) and magnesium fluoride ($MgF_2$) was formed in a thickness of 100 nm on the surface of the aluminum alloy material.

The above fluorine-passivation film was found to be composed of magnesium fluoride mainly, and the balance of aluminum fluoride, and the like by ESCA spectroscopy.

As above, the housing members 21, 22 were prepared. Incidentally, the fluorine-passivation film PFP' formed simultaneously on the external surface of the laser chamber housing member is not a necessary film.

Subsequently, a heat exchanger 32, a blower 31, electrodes 26, 27, and so forth which have a fluorine-passivated surface respectively were built in to provide the laser chamber 1 shown in FIG. 5. In this Example, the heat-exchanger 32 was constructed from a material of JIS-5052 having been electrolytically polished and fluorine-passivated, and the blower 31 was constructed from a material of SUS-316 having been electrolytically polished and fluorine-passivated.

In this Example, the electrode material was HAYNES®214™ alloy. This alloy had been subjected to vacuum double fusion treatment to decrease the oxygen content to 9 ppm or lower. The resulting electrodes were formed from a nickel-based alloy having an oxygen content of 9 ppm, and contained of 75% by weight of Ni, 4.5% by weight of aluminum, 3% by weight of iron, and 16% by weight of chromium.

Figure 1:
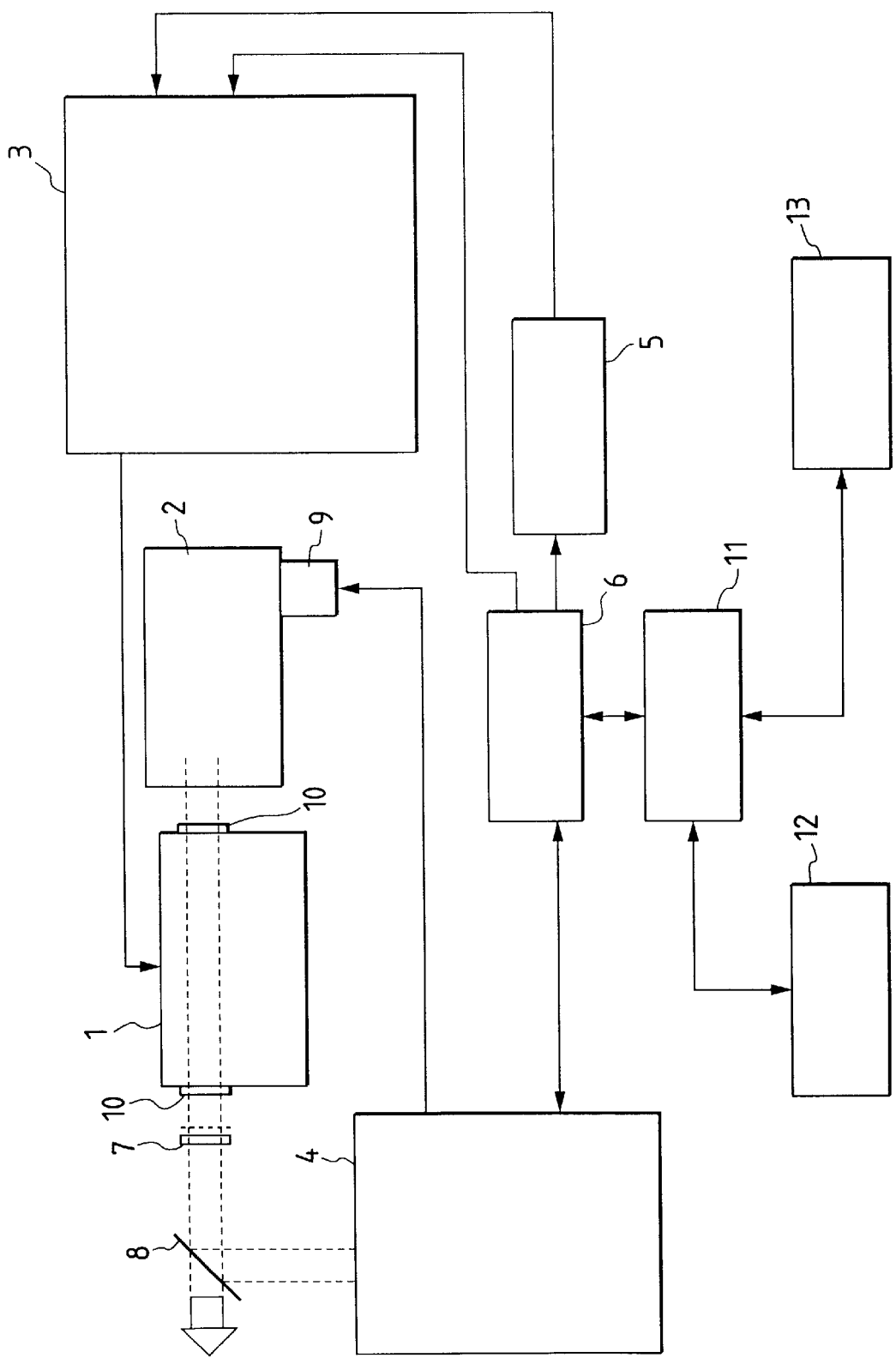
FIG. 1 is a chart showing a system of an excimer laser oscillator.
Figure 2:
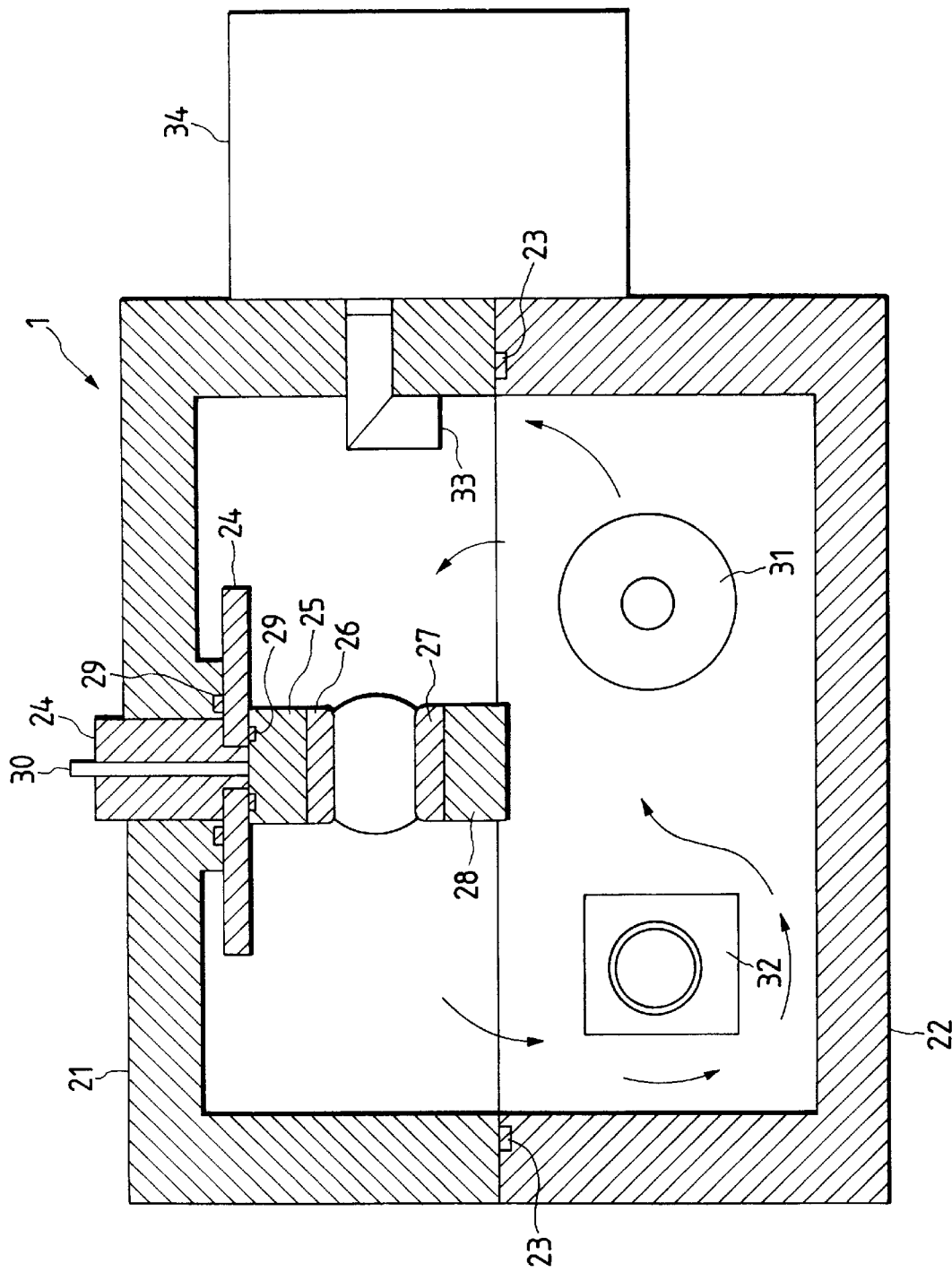
FIG. 2 is a schematic sectional view showing structure of a laser chamber.
Figure 3:
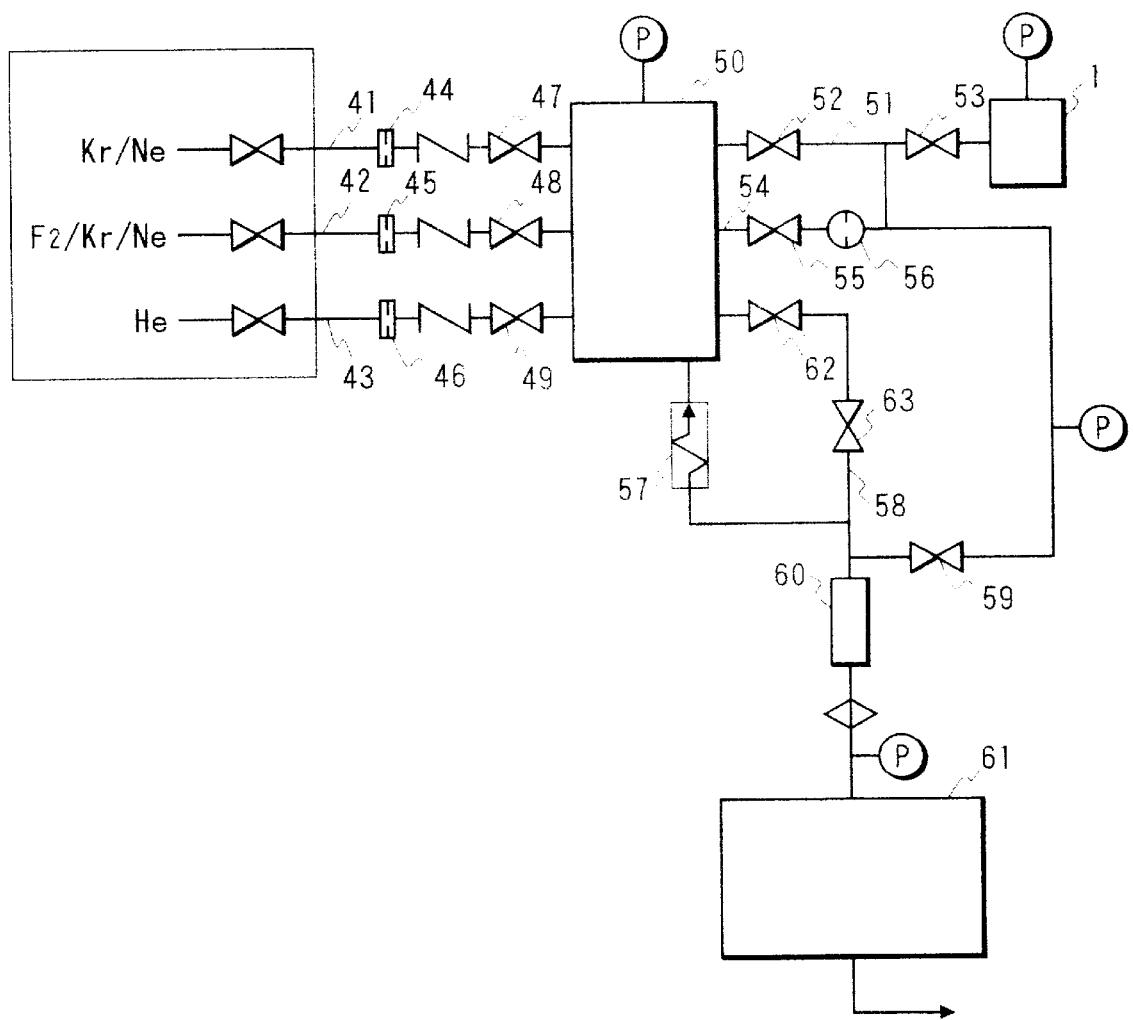
FIG. 3 shows a system for supplying gases to the laser chamber.

This laser chamber was incorporated into the laser system similar to the one shown in FIG. 1, and an $F_2$/Kr/Ne gas was sealed in the laser chamber 1 by means of a supply system similar to the one shown in FIG. 3.

With this excimer laser oscillator, after generation of $3 \times 10^8$ pulses of oscillation, the variation of the pulse energy was 5%.

COMPARATIVE EXAMPLE

In this Comparative Example, the electrodes were formed from an Ni-based alloy containing oxygen at a content of 15 ppm. Laser oscillation was produced in the same manner as in Example 1. The variation of the pulse energy was as much as about 10%.

EXAMPLE 2

In this Example, the electrodes were formed from an Ni-based alloy containing oxygen at a content of 1 ppm. Laser oscillation was produced in the same manner as in Example 1. The variation of the pulse energy was as low as 3%.

Figure 7:
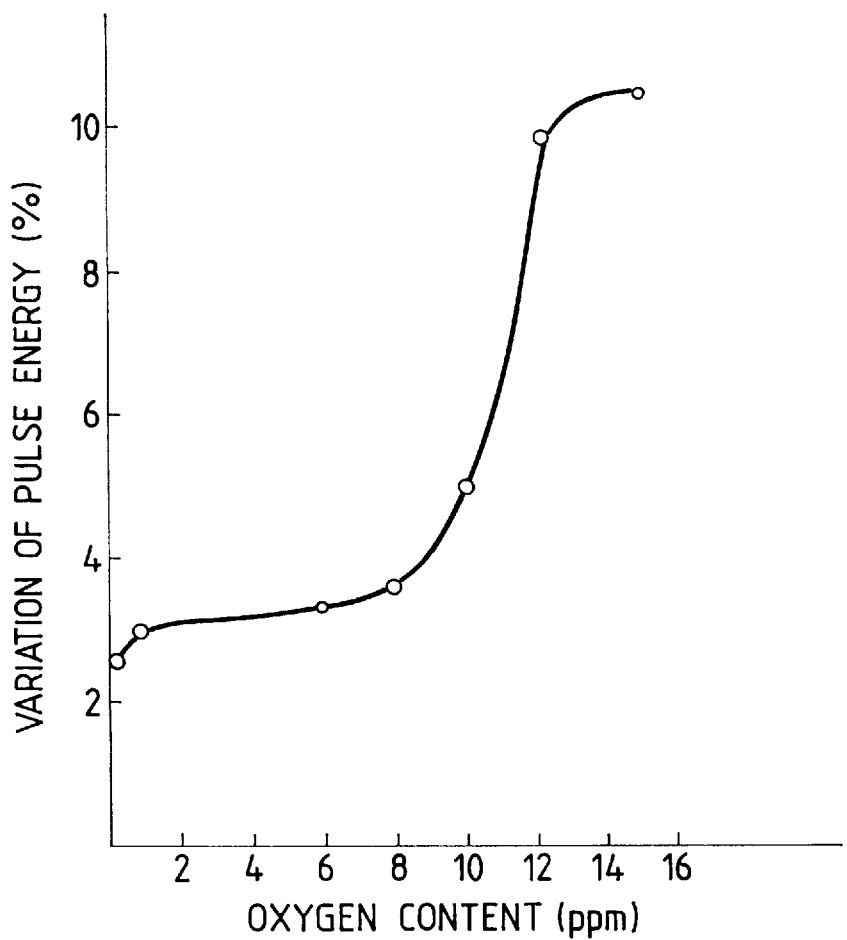
FIG. 7 is a graph of experimental results showing dependence of variation of the pulse energy on the oxygen content of the electrode.

FIG. 7 shows the dependency of the pulse energy on the oxygen content of the electrodes.

EXAMPLE 3

Laser oscillation was produced at 15 kW with the apparatus of Example 1. At the time when the variation of the pulse energy increased to 10%, the electrodes were taken out from the apparatus, and the tips of the electrodes were examined by electron microscopy. Thereby, the tips were found to have been changed in the shape by deterioration.

Therefore, at the time when the variation of the pulse energy increased to 10%, gaseous argon was introduced into the chamber, and the oscillation was produced at 20 KW for 3 seconds to restore the shape of the electrodes.

After the restoration of the electrode shape, the electrode tips were observed again by electron microscopy to find that the deteriorated portions were restored to the original state. Then the gas in the chamber was changed to the original composition, and the oscillation was produced at 15 KW. Consequently, no variation of the pulse energy was observed.

EXAMPLE 4

The apparatus equipped with the laser chamber having the aforementioned discharge electrodes was employed as the light source. A substrate (semiconductor wafer) on a stage for substrate movement was exposed to the light through a reticle (or a mask). Consequently, a fine pattern of 0.25 $\mu$m or finer could be printed over a long term without trouble.

According to the present invention, the variation of the produced pulse energy can be decreased, and the electrode shape can be restored by the simple method.

Aligner

The aligner is explained which employs the excimer laser apparatus having the electrodes of the present invention.

Aligners include demagnification aligner employing an optical lens system, and lens type non-magnification aligner. For exposing of the entire face of the wafer, a step-and-repeat type stepper is preferable which repeats exposure of one small section (field) of the wafer and movement of the wafer by one step for the next exposure of the adjacent field. Naturally, the electrode of the present invention is also useful for a micro-scanning type aligner.

Figure 8:
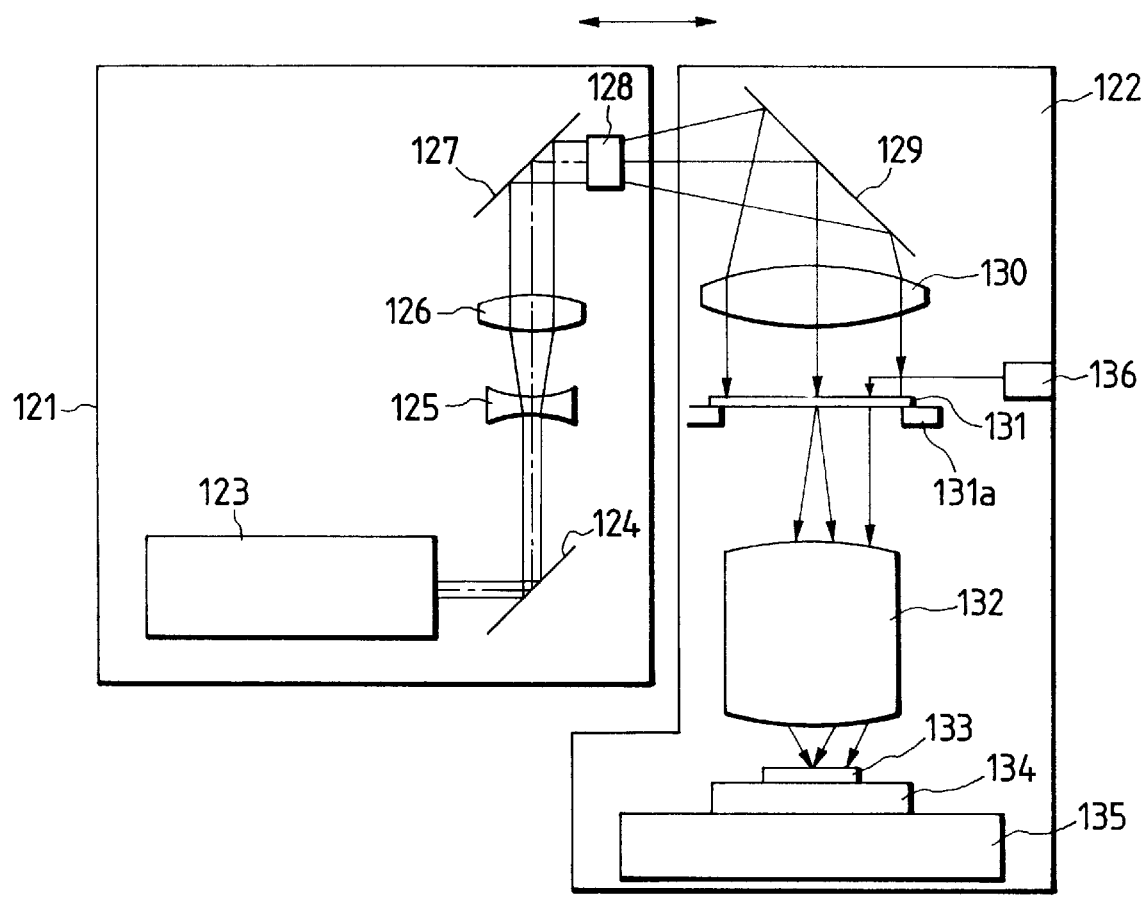
FIG. 8 is a drawing illustrating an aligner of the present invention.

FIG. 8 is a schematic diagram showing construction of an aligner of the present invention. As shown in FIG. 8, the aligner is comprised of a light source section 121 and an exposure mechanism section 122 separately. The light source section comprises a light source 123 for the excimer laser, a mirror 124, a convex lens 125 and a concave lens 126 serving as a beam expander to expand the laser beam diameter approximately to the size of an optical integrator, a mirror 127, and an optical integrator 128 for illuminating uniformly the reticle. The light source section 121 is comprised of members of from the laser light source 123 to the optical integrator 128. The exposure mechanism section 122 comprises a mirror 129, a condenser lens 130 for collimating the light flux introduced from the optical integrator 128, a reticle 131 having a circuit pattern, a reticle holder 131a for holding the reticle, an optical projection system 132 for projecting the pattern on the reticle, an X-Y stage 134 for holding a wafer 133 and moving it in X and Y directions in step-and-repeat printing, and a level block 135 of the aligner. On the wafer 133, the pattern on the reticle 131 is printed by the projection lens 132.

The exposure mechanism section 122 is comprised of the members of from the mirror 129 as a part of the optical illumination system to the level block 135. An alignment means 136 is used for TTL alignment. Usually, the aligner is provided with an autofocusing mechanism, a wafer-moving mechanism, and so forth, which are also incorporated in the exposure mechanism section 122.

What is claimed is:

1. A discharge electrode for an excimer laser oscillator, containing oxygen at a content of not more than 10 ppm, wherein the electrode comprises a nickel-based alloy.

2. The discharge electrode for an excimer laser oscillator according to claim 1, wherein the content of oxygen is not more than 1 ppm.

3. The discharge electrode for an excimer laser oscillator according to claim 1, wherein the electrode comprises a nickel-based alloy containing oxygen.

4. The discharge electrode for an excimer laser oscillator, according to claim 3, wherein the nickel-based alloy contains at least one of Fe, Cr, and Al.

5. An excimer laser oscillator, employing a discharge electrode which contains oxygen at a content of not more than 10 ppm, wherein the electrode comprises a nickel-based alloy.

6. The excimer laser oscillator according to claim 5, comprising (i) a laser chamber, and (ii) one of a blower and a heat exchanger, wherein the internal surface of (i) said laser chamber, and the surface of (ii) said one of the blower and the heat exchanger are passivated with fluorine.

7. A stepper, comprising:

an excimer laser oscillator employing a discharge electrode which contains oxygen at a content of not more than 10 ppm wherein the electrode comprises a nickel-based alloy, and a stage for moving a substrate.

8. A method of restoring the shape of a discharge electrode such that there is no deposition on the surface of the discharge electrode, comprising:

introducing an inert gas into a laser chamber, and conducting discharge for several seconds.

9. The method of restoring the shape of a discharge electrode according to claim 8, wherein the discharge is conducted with a power of 20 KW.

* * * * *